(12) United States Patent
Siala et al.

(10) Patent No.: US 6,424,644 B1
(45) Date of Patent: Jul. 23, 2002

(54) CDMA DIGITAL COMMUNICATION PROCESSES WITH DISTRIBUTION OF REFERENCE SYMBOLS

(75) Inventors: Mohamed Siala, Clamart; Daniel Duponteil, Vanves, both of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/373,590

(22) Filed: Aug. 13, 1999

(30) Foreign Application Priority Data

Aug. 20, 1998 (FR) .............................. 98 10579

(51) Int. Cl.[7] .............................................. H04B 7/216
(52) U.S. Cl. ........................ 370/342; 370/335; 375/206
(58) Field of Search ................. 370/342, 335, 370/478, 311; 375/206, 148, 349, 130, 330–333, 152, 344; 455/69, 88, 522, 344, 255

(56) References Cited

U.S. PATENT DOCUMENTS

| 5,414,728 | A | | 5/1995 | Zehavi |
| 5,751,763 | A | | 5/1998 | Bruckert |
| 5,767,738 | A | | 6/1998 | Brown et al. |
| 5,799,035 | A | * | 8/1998 | Lattard et al. ............... 375/206 |
| 6,044,119 | A | * | 3/2000 | Sato et al. ................... 375/344 |
| 6,064,663 | A | * | 5/2000 | Honkasalo et al. ......... 370/335 |
| 6,208,632 | B1 | * | 3/2001 | Kowalski et al. ........... 370/335 |

FOREIGN PATENT DOCUMENTS

| WO | WO 95/12938 | 5/1995 |
| WO | WO 97/45970 | 12/1997 |

* cited by examiner

*Primary Examiner*—Kwang Bin Yao
*Assistant Examiner*—Prenell Jones
(74) *Attorney, Agent, or Firm*—Oblon, Spivak, McClelland, Maier & Neustadt, P.C.

(57) ABSTRACT

A process for improving the reception quality of a Code Division Multiple Access (CDMA) signal that judiciously distributes reference symbols between two CDMA signal components, namely an in phase component (I) and quadrature component (Q). The reference symbols are distributed in only one of the two components, namely the I or Q component. To further improve the reception quality, the pseudo-random spreading sequence used for one of the components is different from the pseudo-random spreading sequence used for the other component. The applications of this process include mobile land radio communications.

10 Claims, 1 Drawing Sheet

CDMA DIGITAL COMMUNICATION PROCESSES WITH DISTRIBUTION OF REFERENCE SYMBOLS

TECHNICAL DOMAIN

The purpose of this invention is CDMA (Code Division Multiple Access) type digital communication processes with distribution of reference symbols. These processes concern transmission and reception of messages.

The invention has applications in mobile land radiocommunication systems. It may be applied for third generation UMTS and IMT-2000 systems.

STATE OF PRIOR ART

Digital communication systems may be classified into two main categories, depending on whether they use packet transmission or continuous transmission. Time Division Multiple Access (TDMA) systems like GSM and DECT systems use packet transmission. CDMA systems, for example like the IS'95 system, make use of Code Division Multiple Access.

In all these systems, the solution of problems related to knowledge about the characteristics of the propagation channel is facilitated by the addition of reference symbols (or pilot symbols) and/or pilot channels.

TDMA systems are currently limited to the processing of two extreme cases: channels which are very selective in frequency (very wide spreading of delays) but not selective in time (negligible Doppler spread) and channels not selective in frequency but which may be very selective in time. The first case is very frequently encountered in land radio mobile systems like GSM. The second is encountered more frequently in satellite radio mobile systems such as ICO and IRIDIUM.

In the case of TDMA satellite communication systems, the reference symbols are distributed on each data packet for best matching to the channel subject to very fast fading. This distribution of reference symbols was successfully used within the ICO project. For example, a uniform distribution of these symbols is described in FR-A-2 747 870.

On the other hand, in the case of TDMA land communication systems, the reference symbols are grouped in the middle of each data packet so that the pulse response of the multipath channel, which is usually very selective in frequency but is not very or not at all selective in time, can be estimated more simply and more efficiently.

In the CDMA technique, symbols to be transmitted are firstly multiplied by pseudo-random sequences (or codes) which has the effect of spreading their spectrum. On reception, the received signal is unspread by filtering adapted to the sequence used on transmission (or by correlation) and is then demodulated.

This technique enables several users to use the same radiocommunication channel, provided that a particular sequence is assigned to each. This technique is called Code Division Multiple Access (CDMA).

In practice, the CDMA signal includes two components, one component said to be in phase (or real) and conventionally denoted I and one component said to be in phase quadrature (or imaginary) and conventionally denoted Q. Each component is obtained by spreading the symbols spectrum and then by modulation of a carrier that is either in phase with a reference carrier (I component) or in quadrature with the same reference carrier (Q component). On reception, the signal received in two distinct I and Q channels are processed separately, and the restored information is grouped.

A description of this technique is given in the general book by J.G. PROAKIS, entitled "Digital Communications", $3_{rd}$ edition, MCGRAW-HILL, 1995 (third edition) 1989 (second edition).

Each of the I and Q channels of an CDMA signal comprises information symbols and reference symbols (or pilots) in order to estimate the channel as in TDMA.

TDMA systems also introduce the concept of a power control period (PCP). The power of the signal sent by the transmitter remains constant during each PCP but may vary in different PCPs to overcome slow fading (due to distance and mask effects) and fast fading due to multiple paths when the terminal moves slowly (selectivity in time).

In the case of conventional CDMA systems, the reference symbols are grouped at the beginning of each PCP. These reference symbols enable an estimate of paths at the beginning of each PCP, by correlation. This estimate is then used in the rest of the PCP to optimize demodulation of information symbols from each path and to recombine them in order to make a decision.

For a slow movement of the terminal and therefore low selectivity in time, the paths estimate for a given PCP may be consolidated by weighted or unweighted averaging with the path estimates of a finite number of previous PCPs.

Existing CDMA systems use either a fixed duration PCP or a variable duration PCP to adapt to the speed of fading observed on the channel. In both cases, reference symbols are usually grouped at the beginning of each PCP.

Grouping of reference symbols has the major disadvantage of leading to a channel estimate for a localized time, even if its quality is good due to the number of symbols that contribute to it. It is then very difficult to follow fast variations of fading (high mobile displacement speeds and/or the use of high frequencies). Transmission performances are thus degraded.

The disadvantage of the localization of reference symbols is partially eliminated if the system can use several reference symbols from several PCPs. This solution, which may be considered satisfactory, cannot be used in time slot mode links in which the estimate must be made PCP by PCP.

The use of short PCPs at the same time as conventional demodulators results in a significant reduction in the capacity of the link and therefore of the system, due to the large number of reference symbols transmitted to ensure a good quality of the link.

With the sustained demand for services requiring continuously increasing throughputs, the frequency spreading band of CDMA systems is always increasing. This increase in the band is accompanied by a continuous increase in the number of paths received at the receiver. This increase in the number of paths results in a reduction in the power received per path for a given received power, and therefore a reduction in the quality of the global channel estimate.

Since CDMA systems are inherently limited by multiple access interference, this loss of performance cannot be compensated by an increase in the power. Furthermore, the increase in the number of reference symbols tends to reduce the capacity of the system.

The purpose of this invention is to overcome these disadvantages.

DESCRIPTION OF THE INVENTION

The main purpose of this invention is to improve the performances of CDMA systems by improving the reception quality for a given emitted power and therefore with an unchanged multiple access interference level. This improvement in quality has a number of advantages, including an increase in the capacity and coverage of the CDMA system.

This improvement is obtained by a judicious distribution of reference symbols between the two channels. According to the invention, the reference symbols are distributed in only one of the two components, namely the I component or the Q component. Furthermore, pseudo-random spreading sequences used for one of the components are different from the pseudo-random spreading sequences used for the other component. This means that information related to reference symbols contained in one channel can be retrieved without deserving the other channel, and vice versa.

The use of reference symbols uniformly distributed along a PCP can give better observation of the propagation channel, which can be used advantageously by the receiver to maintain a practically constant connection quality regardless of the speed, even for extremely wide occupied bands. In this receiver, we will only deal with the channel containing reference symbols to restore information about these symbols using unpreading sequences specific to this channel. This channel separation is specific to CDMA and cannot exist in TDMA.

The distribution of reference symbols into one of the two components is one way of observing and accurately following variations in the multipath channel, from end to end, on a given time slot, in an optimized manner. In other words, it is a means of heuristically creating the equivalent of the Nyquist sampling theorem that guarantees perfect reconstruction of a narrow band (Doppler spread) signal (in fact one of the paths), starting from samples uniformly distributed in time (distributed reference symbols resulting in regular sampling in our case) provided that the sampling rate is greater than the signal band.

The maximum observable Doppler frequency is directly related to the rate of observations made through the reference information. Consequently, for a given number of reference bits, it is better to distribute the CDMA signal uniformly on only one of the I or Q components. The result is then an enhanced observation rate, which obviously has some advantages for large Doppler values.

In current land mobile systems, high Doppler frequencies are due to large terminal displacement speeds. But they are observed at much lower displacement speeds in association with high frequency bands (5 GHz and more) which can then be used without too much difficulty.

Furthermore, it can be seen that very high Doppler frequencies exist in satellite systems.

Finally, note that the fact that uniform information is available on the propagation channel has more advantages than the maximum Doppler frequency that can thus be followed. For a given number of bits used, estimating processes are available that operate better if these bits are uniformly distributed. For example, the French patent deposited on the same date as this patent and by the same applicant, and entitled "Iterative rake receiver and a corresponding reception process" describes a process of this type with the corresponding claims.

Another purpose of this invention is to facilitate the manufacture of terminals making them much less sensitive to inaccuracies in the local oscillator used to transpose the received signal into base band.

Therefore more precisely, the purpose of the invention is a process for code division multiple access type digital communications in which a signal with two components is emitted:

a first component obtained by spectrum spreading of first symbols by first pseudo-random sequences and modulation of a first carrier in phase with a reference carrier, this first component being said to be in phase and denoted I, a second component obtained by spectrum spreading of second symbols by second pseudo-random sequences and by modulation of a second carrier in phase quadrature with the said reference carrier, this second component being said to be in quadrature and denoted Q, the symbols comprising information symbols and reference symbols, this process being characterized in that the reference symbols are distributed in only one of the two I or Q components, and in that the first pseudo-random sequences specific to the I component are different from the second pseudo-random sequences specific to the Q component.

In one particular embodiment, the reference symbols are distributed in groups of several symbols (2 or more).

In another embodiment, the reference symbols are distributed one by one.

Another purpose of the invention is a process for code division multiple access type digital communications in which a signal emitted according to the process that was just defined above in two distinct I and Q channels is processed using different pseudo-random sequences corresponding to the first and second sequences used in transmission respectively, this process being characterized in that the reference symbols present in only one of the channels are used to estimate the characteristics of the propagation channel.

Description of particular embodiments

Figure 1:
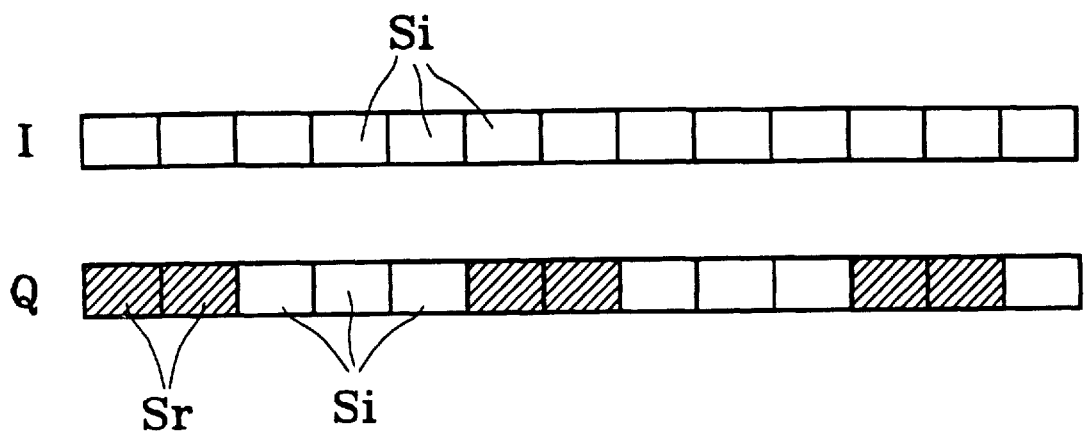
FIG. 1 illustrates a distribution of the reference symbols in groups of two.
Figure 2:
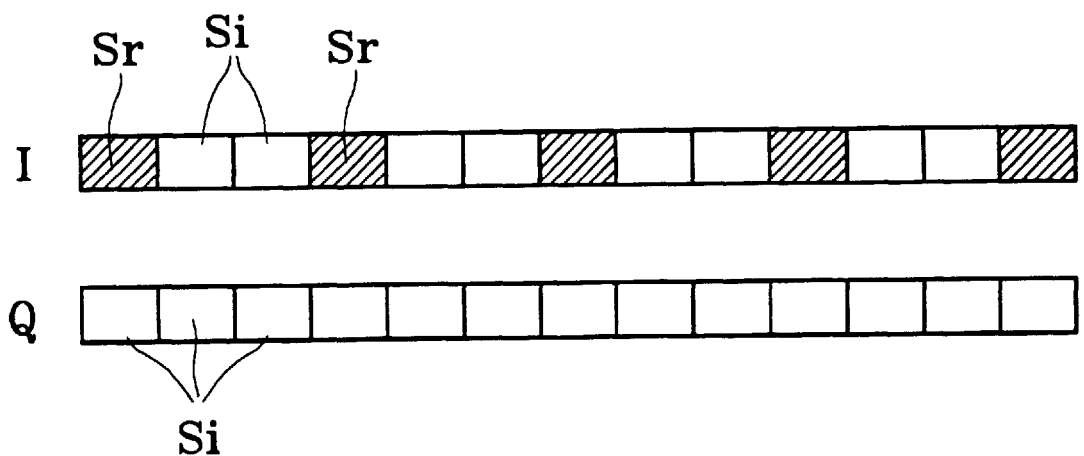
FIG. 2 illustrates a distribution of the reference symbols one by one.

The attached FIGS. 1 and 2 symbolically show the two I and Q components of a CDMA signal. The reference (or pilot) symbols are referenced Sr and are shown in dashed lines, whereas the information symbols are referenced Si and are shown in white.

In FIG. 1, the reference symbols Sr are distributed in the Q component only and are assembled in groups of 2. In FIG. 2, the reference symbols Sr are distributed in the I channel and are laid out one by one.

What is claimed is:

1. A code division multiple access digital communication process, in which a signal with two components is emitted, comprising steps of:

obtaining an in-phase, I, component of said signal by spectrum spreading first symbols with a first pseudo-random sequence and modulating a first carrier in phase with a reference carrier; and obtaining a quadrature, Q, component of said signal by spectrum spreading second symbols with a different pseudo-random sequence and modulating a second carrier in phase quadrature with said reference carrier, wherein, the in-phase component comprises information symbols and reference symbols; and the quadrature component comprises the information symbols and does not include the reference symbols.

2. The process according to claim 1, further comprising a step of distributing the reference symbols in the in-phase component in groups of several symbols.

3. The process according to claim 1, further comprising a step of distributing the reference symbols in the in-phase component one by one.

4. The process according to claim 1, further comprising a step of distributing the reference symbols in the in-phase component within a single power control period.

5. The process according to claim 1, further comprising a step of:
processing the reference symbols of a channel to estimate characteristics of a propagation channel.

6. A code division multiple access digital communication process, in which a signal with two components is emitted, comprising steps of:
obtaining an in-phase, I, component of said signal by spectrum spreading first symbols with a first pseudo-random sequence and modulating a first carrier in phase with a reference carrier; and
obtaining a quadrature, Q, component of said signal by spectrum spreading second symbols with a different pseudo-random sequence and modulating a second carrier in phase quadrature with said reference carrier, wherein,
the in-phase component comprises information symbols and do not include reference symbols, and
the quadrature component comprises information symbols and reference symbols.

7. The process according to claim 6, further comprising a step of distributing the reference symbols in the quadrature component in groups of several symbols.

8. The process according to claim 6, further comprising a step of distributing the reference symbols in the quadrature component one by one.

9. The process according to claim 6, further comprising a step of distributing the reference symbols in the quadrature component within a single power control period.

10. The process according to claim 6, further comprising the step of:
processing the reference symbols of a channel to estimate characteristics of a propagation channel.

* * * * *